R. B. SWANK.
AEROPLANE.
APPLICATION FILED APR. 17, 1913.
1,089,880.
Patented Mar. 10, 1914.
6 SHEETS—SHEET 5.
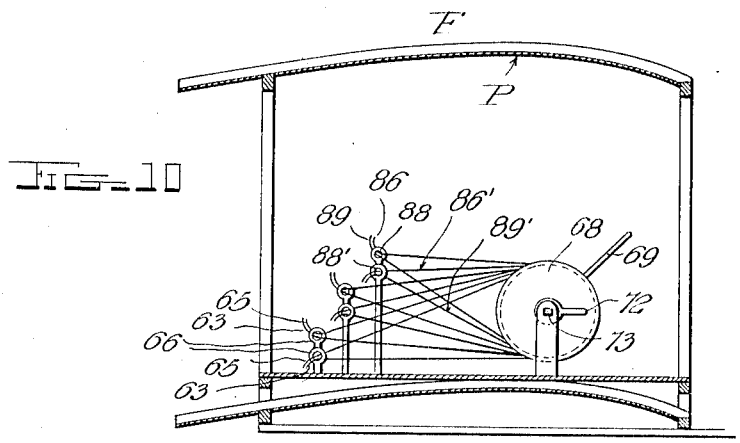
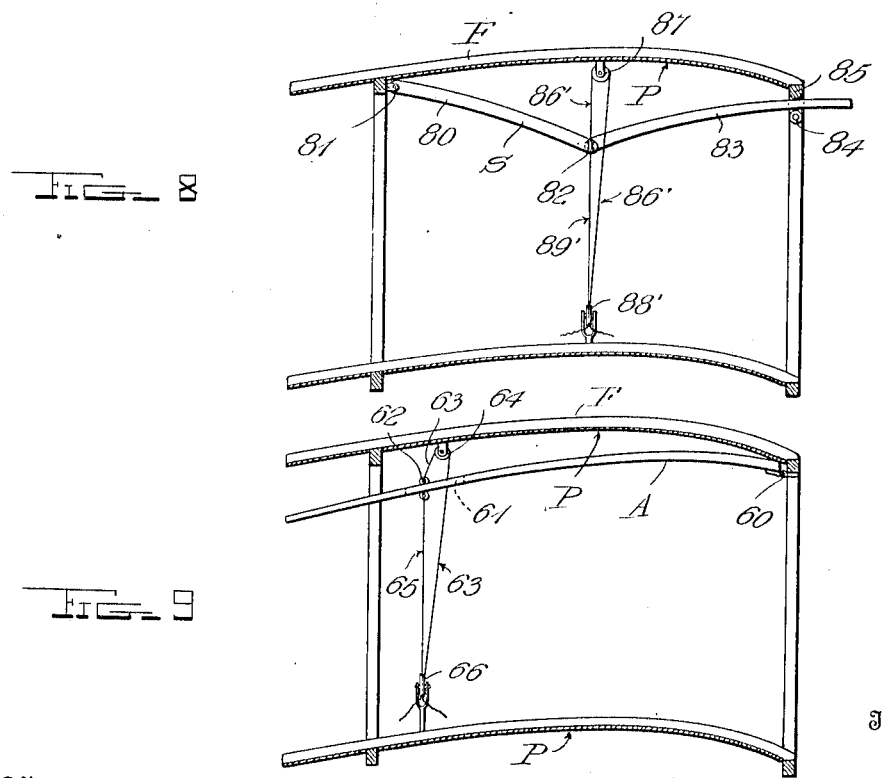
Witnesses
Inventor
Reuben B. Swank
By H. B. Willson & Co.
Attorneys

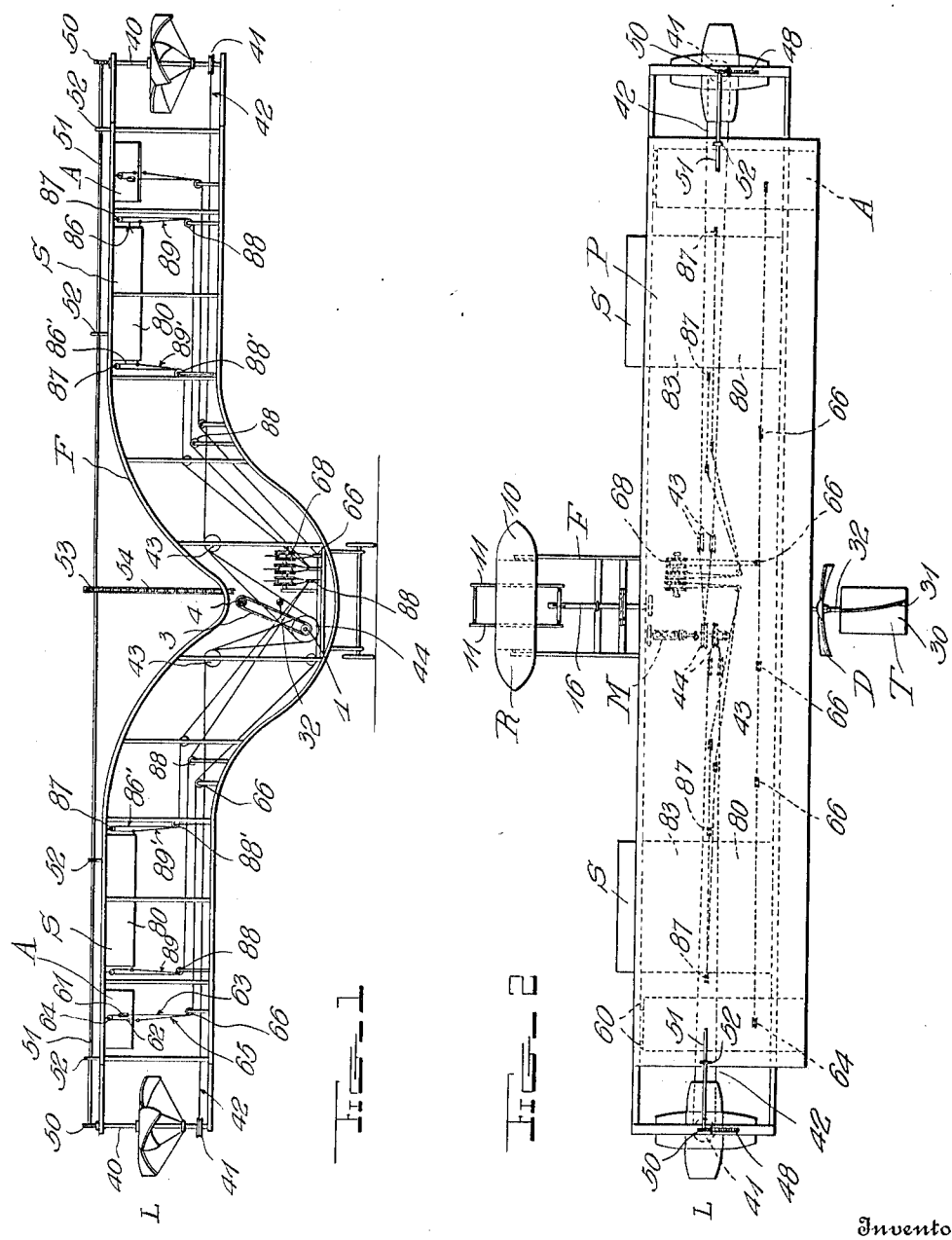

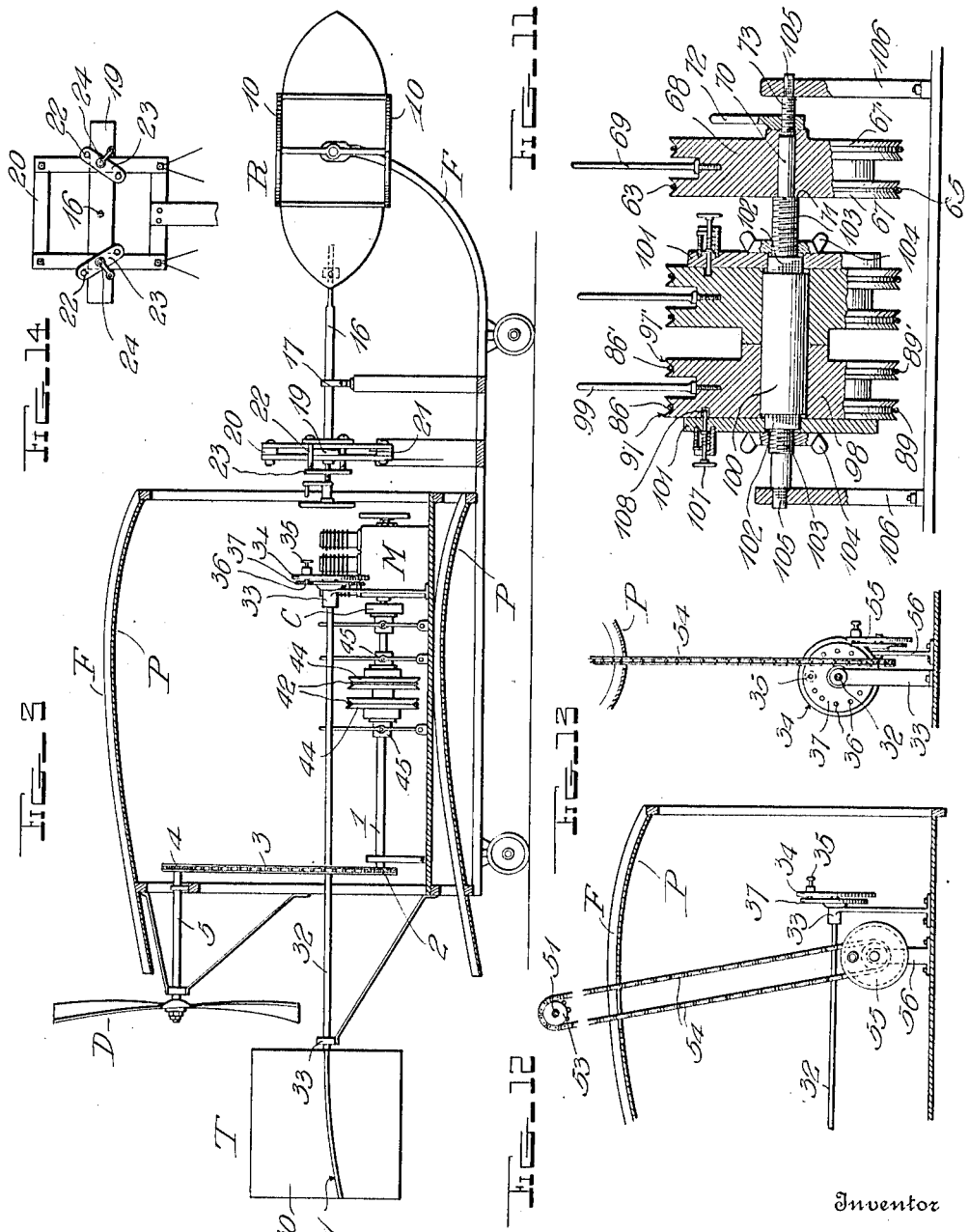

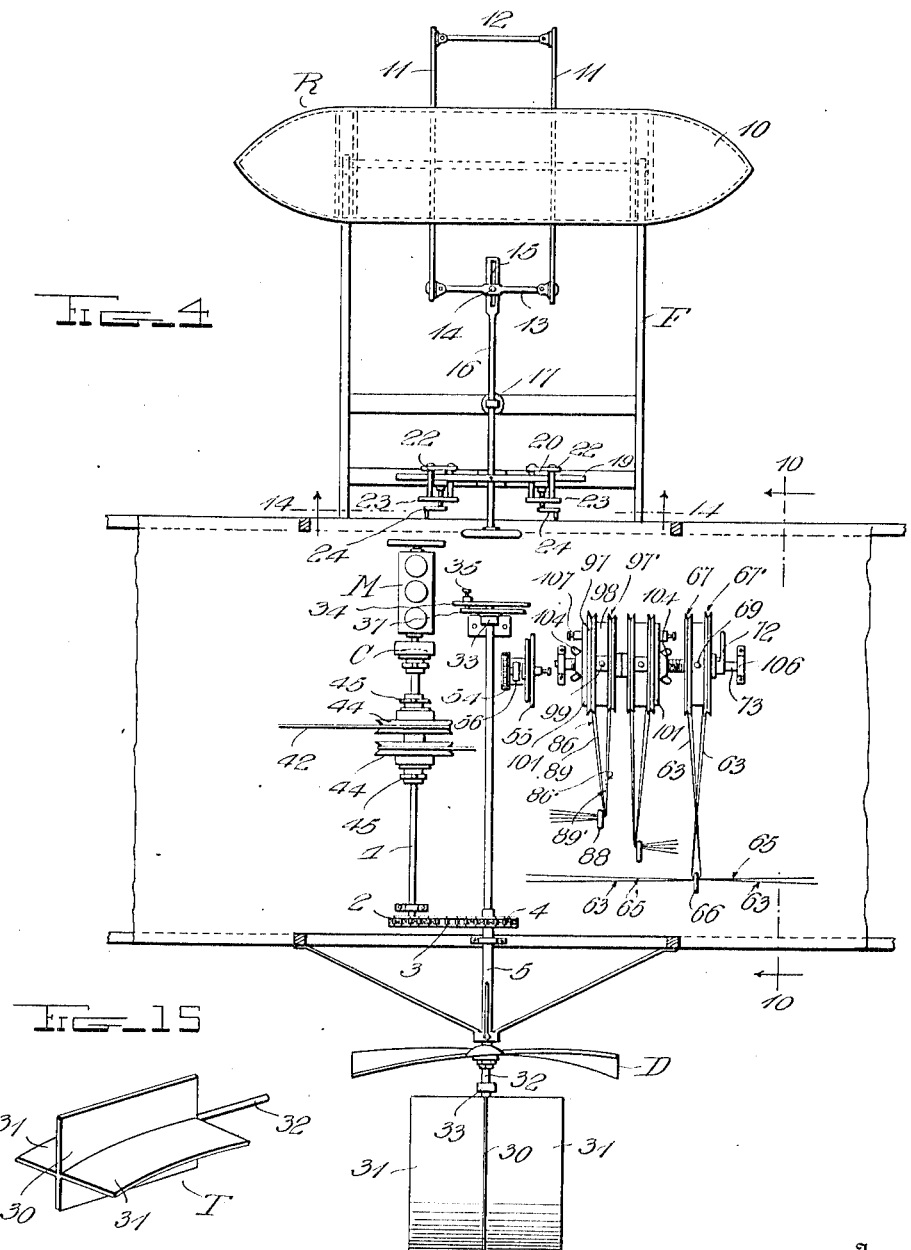

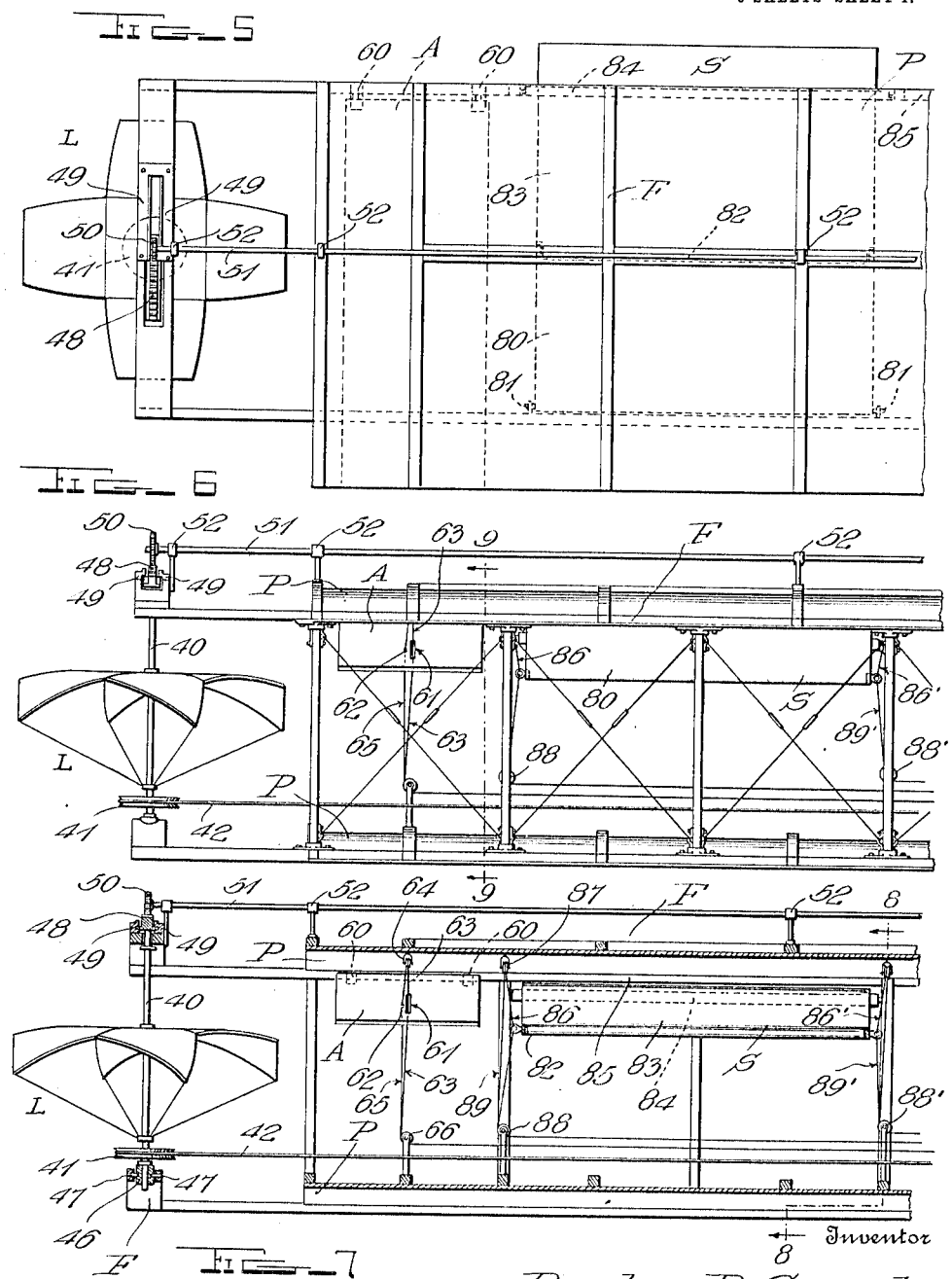

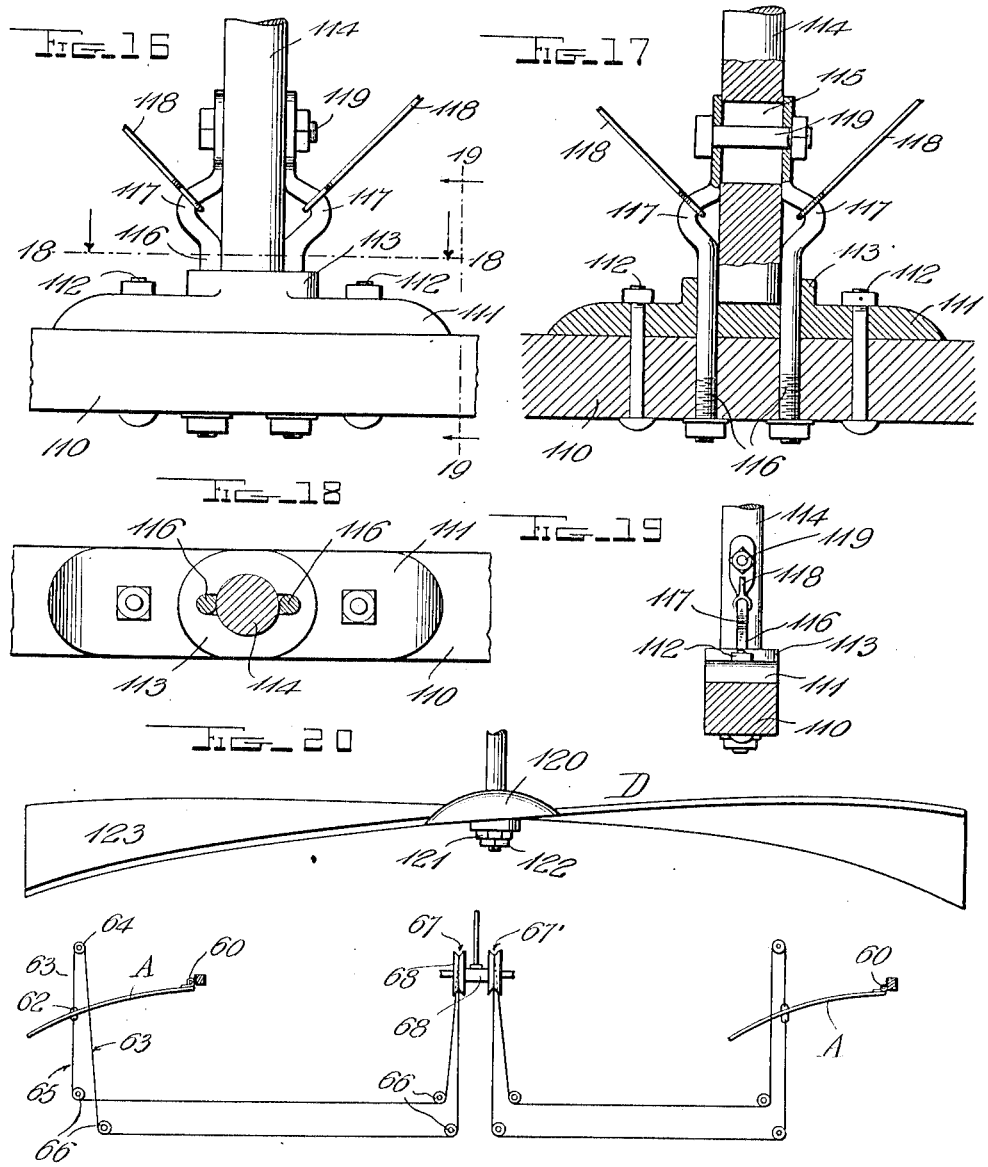

UNITED STATES PATENT OFFICE.

REUBEN B. SWANK, OF DAYTON, OHIO.

AEROPLANE.

1,089,880. Specification of Letters Patent. Patented Mar. 10, 1914.

Application filed April 17, 1913. Serial No. 761,768.

*To all whom it may concern:*

Be it known that I, REUBEN B. SWANK, a citizen of the United States, residing at Dayton, in the county of Montgomery and State of Ohio, have invented certain new and useful Improvements in Aeroplanes; and I do declare the following to be a full, clear, and exact description of the invention, such as will enable others skilled in the art to which it appertains to make and use the same.

This invention relates to aeronautics, and more especially to aeroplanes; and the main object of the present invention is to effect improvements on my prior patent dated March 19, 1912, and bearing number 1,020,628.

More especially this is carried out by adopting an improved form of lock for the tiller which controls the front runner, and a new form of pivotal support for the upright shafts which drive the lifting propellers, and by embodying in the machine manually controlled ailerons near the lateral extremities of the framework and just inside said lifting propellers, and manually controlled stabilizers or wings just inside the ailerons.

The invention further consists in the provision of a novel form of manually controlled tail or rear steering device.

The invention also consists in the details of construction used in conjunction with the novel features; all as more fully described in the following specification and typically illustrated on the drawings wherein—

Figure 1 is a diagrammatic rear end elevation, and Fig. 2 a diagrammatic plan view of this machine with parts broken away. Fig. 3 is an enlarged central vertical longitudinal section, with the parts in rear of the section line omitted. Fig. 4 is an enlarged plan view of the machine with the right and left hand ends of its framework omitted and also the upper plane omitted. Fig. 5 is a plan view of one end of the framework, Fig. 6 a rear elevation thereof, and Fig. 7 a vertical longitudinal section thereof. Fig. 8 is a section on about the line 8—8 of Fig. 7, and Fig. 9 a section on about the line 9—9 of Fig. 6. Fig. 10 is a section on about the line 10—10 of Fig. 4, showing more particularly the manual control for the ailerons and the wings; and Fig. 11 is a still further enlarged longitudinal section through said controlling devices. Fig. 12 is a detail view in side elevation, and Fig. 13 a similar detail in end elevation, of the manual control for adjusting the angle of the axes of the lifting propellers. Fig. 14 is an enlarged section on the line 14—14 of Fig. 4, giving a detail of the improved form of tiller lock. Fig. 15 is a detail perspective view of the tail. Fig. 16 is an enlarged elevation showing the form of connection between the members of the frame, and Fig. 17 is a vertical section through this connection. Figs. 18 and 19 are sectional views on the lines 18—18 and 19—19 of Fig. 16. Fig. 20 is an enlarged plan view of the driving propeller. Fig. 21 is a diagram illustrating the hand control for the two ailerons.

Much latitude will be allowed to the builder of this machine with respect to its framework F, but as usual with air craft it will doubtless be made up of light sticks, rods or tubes rigidly connected at points where they meet and properly braced by fine piano wire as seen in Figs. 16 and 17, and, if the machine is a biplane which is my preferred construction, it will have upper and lower fixed planes P, P extending parallel with each other throughout the entire length of the transverse framework as best seen in Fig. 1, while forward extensions of said framework carry the steering rudder as seen in Fig. 2. Nor do I wish to be limited as to the details of the motor M, although preferably it will be of high power and of the internal combustion type, mounted in the dropped center of the framework at one side of the medial line or keel thereof over which the operator is located, and counterbalanced by machinery or tanks in a manner well known to engineers who are familiar with structures of this character. Rubber-tired wheels will also preferably be provided to support the machine while it is at rest on the ground. For forcing the machine forward through the air I have shown a special propeller D driven by connection with the motor M, and the fixed planes P, P are by preference dished a little on their under side as seen in Fig. 3, and inclined slightly to a horizontal so that the forward impetus of the driving mechanism lifts the weight of the machine and its occupants as long as the machine travels on an even keel.

Coming now to a more detailed description, rotary power is communicated from the motor M through a main clutch C to the main shaft 1, and from a power sprocket wheel 2 thereon by means of a chain belt 3 to a sprocket pinion 4 on the shaft 5 of the propeller D which, as shown in Fig. 3, is mounted rather high and just in rear of the uppermost plane P; and it is the forward impulse imparted to the machine by this driving propeller D, combined with the slight inclination possessed by the planes P, which sustains the machine in its flight through the air.

The rudder R for steering this machine is disposed at the forward end thereof and is shown herein as constructed much as in my prior patent above referred to. It is composed of two substantially horizontal planes 10, 10, crossed by two upright and normally longitudinal planes 11, 11, the whole pivotally supported on the front end of the framework F and the upright planes connected at front and rear by rods 12 and 13 as best seen in Fig. 4. The last-named rod has a pin 14 loosely engaging a slot 15 in the front end of the tiller 16, and said tiller is mounted on a universal joint 17 at about the center of its length, while its rear end carries a hand wheel which may be raised or lowered or moved from side to side to adjust the position of the rudder in a manner well understood. My improved means for locking the position of this tiller, best seen in Fig. 14, comprises a cross bar 19 through which the tiller 16 passes, a frame 20 having upright slots 21 in its side bars within which the cross bar 19 moves freely, and around each side bar and over each end of said cross bar a clip 22 whose arms pass through a clip plate 23 and which latter carries a hand screw 24 as shown. When these screws are loosened the clips permit the vertical and lateral movement of the cross bar 19 as the tiller 16 is moved within the frame 20, but at any time it is desired to lock or set the tiller in one position the hand screws 24 are tightened up and they clamp the cross bar 19 in the position it then occupies within the frame.

An important feature of the present invention lies in the use of a special form of tail T, best seen in Fig. 15, and shown in use in Figs. 2 and 3. This tail in addition to its framework comprises an upright plane or fin 30 and a substantially horizontal plane 31 which crosses the upright fin but which is itself curved longitudinally a little as seen in Fig. 3; and from the point where these planes intersect a rod 32 leads forward through suitable bearings 33 to a hand wheel 34 which preferably carries a spring-actuated plunger 35 adapted to enter any of a number of sockets 36 in a plate 37 fixed adjacent said wheel, whereby the latter is locked in any position to which it is adjusted. By withdrawing this plunger from a certain socket and turning the wheel properly, the rod 32 sets the tail as may be desired. When set as shown in Fig. 3, the slight curvature or dish possessed by the plane 31 coacts with the curvature of the main planes P and sustains the rear end of the machine as the latter passes through the air, and in this position the tail acts as one of the sustaining planes, although it works against the rudder by raising the rear end of the machine slightly and therefore tending to tip the front end downward. When the hand wheel is reversed so that the dish of the curved plane 31 is the other side up, it will be clear that it acts in opposition to the main planes P, and the rudder R must be adjusted accordingly. When, however, the operator sets this tail at quartering positions between the two extremes just described, so that the curved plane 31 stands substantially vertical as seen in Fig. 2, it will be clear that it serves in the nature of a rudder at the rear of the machine the same as though the tail of a fish were inclined a little to one side. This use of the tail may be rare if the rudder R is in good working order or if it be sufficient, but I apprehend that on occasions it may be extremely valuable to have an additional rudder which may thus be thrown into action by a simple turning of the handwheel 34 to its proper position. Manifestly a skilful operator may set the tail in such manner that its curved plane 31 will stand oblique so that he may secure both the vertical and the horizontal results of its curvature.

As in my prior patent above referred to, I preferably employ lifting propellers L at the extreme side ends of the framework F, each of which is mounted on an upright shaft 40 and driven from the motor M by suitable connections. The latter as illustrated consist of a drive pulley 41 fast on the lower end of the shaft, and a belt 42 leading from the same over suitable guides or idle pulleys such as those numbered 43, to a driving pulley 44 mounted loosely on the main shaft 1 and adapted to be thrown into connection therewith by a clutch mechanism 45 under the control of the operator. Two such driving pulleys and clutches are shown in Fig. 3, and obviously when these are separately connected with the two lifting propellers L at opposite sides of the machine, either may be thrown into action irrespective of the other. The lower end of the upright propeller shaft 40 is stepped in a bearing block 46 (see Fig. 7) which in turn is pivoted between two side pins 47 in the frame F so that this block may rock forward and backward; and the upper end of said shaft is journaled in a rack bar 48 which is movable through suitable guides 49 in the framework F, said rack bar being engaged by a gear wheel 50 fast on a shaft 51 mounted in bearings 52 across the uppermost plane P as best seen in Fig. 1. This shaft at its center carries a sprocket gear 53

(Figs. 12 and 13) connected by a chain belt 54 with a similar gear on the shaft of a hand wheel 55 which is journaled in a standard 56 and adjustable therein by any suitable means, such as those already described with reference to the hand wheel on the rod 32 which controls the disposition of the tail. By turning this hand wheel 55 and setting it fast, the chain belt imparts rotary motion to the shaft 51, and the latter through its gears 50 moves the rack bars 49 so that the upper ends of the upright shaft 40 of the lifting propellers are moved either forward or backward. Hence it is possible for the operator to adjust the angle of these shafts 40 and therefore the axes of said lifting propellers, and it is obvious that when the shafts are caused to incline forward the propellers will not only lift the machine but assist in its propulsion, whereas when the shafts are inclined to the rear the propellers will resist the forward as well as the downward movement of the machine and may be utilized in making a landing. Ordinarily, however, these lifting propellers are employed at starting or when the aviator desires to ascend, and their shafts are tilted forward and thrown into action conjointly with the propelling mechanism only at times when such conjoint action becomes necessary or desirable. Attention is directed to the fact that while these lifting propellers may be independently thrown into or out of connection with the main shaft 1, their angles are adjusted simultaneously by a single controlling device as described. Next inside the lifting propellers (and by preference between the two fixed planes as seen in Fig. 6, whereas said propellers are beyond the extremities of such planes) are hinged planes (herein called ailerons A) as best seen in Figs. 5, 6, 7 and 9, and as they are alike I will describe but one. Hinged at 60 to the forward cross bar of that portion of the frame which carries the upper fixed plane P is a plane much like it in transverse section and which will doubtless be made of a like frame covered over with fabric, but each aileron A should have substantially the same curvature as the plane P above it as shown in Fig. 9 so that when completely raised it will have no effect on this end of the machine. Through the aileron A at a suitable point is formed a slot 61, and adjacent the same at the point 62 is connected a cord 63 which leads upward over a pulley 64 carried by the upper fixed plane P or the frame thereof, and thence downward through the slot 61 along with a second stretch of cord 65 which leads directly downward from the point 62. These two stretches are led thence through suitable guides or over idle pulleys 66 and eventually pass in opposite directions around a groove 67 in a drum 68, best seen in Figs. 11 and 21.

Similarly the two stretches of cord from the aileron at the opposite end of the frame F are led around another groove 67' at the other end of the drum. The latter is controlled by a hand lever 69 by means of which it can be turned on its supporting shaft 70, and after its adjustment it may be held against a shoulder 71 on said shaft by means of a hand nut 72 which is threaded on the shaft at 73. Hence the manipulation of the hand lever 69 turns the drum 68, and through the two pairs of cords this raises one aileron and lowers the other. When either is raised into or substantially into contact with the uppermost plane P, its influence on the machine practically disappears, but when it is lowered as seen in Fig. 9 it tends to raise the machine at this side, whereas the rudder at the front edge of the machine is for adjusting the forward end of the whole machine and the tail T for adjusting the rear end thereof. These three elements are likewise serviceable in descending or in soaring when possibly the rotation of all propellers has ceased, and as they may be adjusted independently of each other the aeronaut can descend or soar at will despite the disquieting influence of cross currents of air.

I have stated above that the disposition of the motor, the tanks, and other heavy pieces of mechanism at the dropped center of the framework F is for the purpose of holding the machine on an even keel, but it is well known to those familiar with this art that other means are desirable if not necessary for imparting stability to an aeroplane. For this purpose I have employed other hinged planes (herein called stabilizers) located between the two fixed planes P next inside the ailerons, and as they are alike a description of one will suffice for both.

As best seen in Fig. 8, each stabilizer S consists of two wings 80 and 83, the former hingedly connected at 81 with the rear frame-bar F of the upper plane P, and the wing 83 pivotally or hingedly connected with the wing 80 on a line 82, whereas the front end of the wing 83 moves over guide rollers 84 and under the front cross bar 85 of said frame. Each of these wings, like the ailerons, will doubtless be constructed of a light framework over which is stretched a light canvas sheet, and their size with reference to that of the planes will be about in the proportion illustrated in Figs. 1 and 2. From the hinge line 82 of each stabilizer, and at the outer end of the frame as seen in Fig. 7, a stretch of cord 86 passes upward over a pulley 87 and another stretch 89 passes directly downward, and these two stretches lead thence inward through suitable guides or over suitable idle pulleys 88 and pass eventually in opposite directions around a groove 97 in a drum 98 which is actuated by a hand lever 99 and is journaled on an enlarged section 100 of the shaft 70 as best seen in Fig. 11; corresponding stretches 86' and 89' from the opposite end of the hinge line 82 passing through similar guides or over similar idle pulleys 88' to another groove 97' at the other side of the drum 98. It will be but a duplication of the description and reference lettering to state that the stabilizer S at the opposite end of the frame F is connected by cords in a similar manner with another and identical controlling device illustrated at the center of Fig. 11. The two drums of these controlling devices are rotatably mounted on the enlarged section 100 of the shaft 70 between plates 101 which engage square portions 102 of said shaft at opposite ends of its enlarged portion, and next outside said squared portions the shaft is threaded as at 103 to receive hand nuts 104 by means of which the parts of these controlling mechanisms are assembled. The extremities of the shaft are by preference squared as at 105 and fit in standards 106. Said plates 101 carry spring-actuated plungers 107 engaging sockets 108 in the drum, and when the plungers are withdrawn the drums may be set by means of their hand levers as they will then turn freely in either direction on the enlarged section 100 of the shaft. But it should be observed that, whereas the single hand lever 69 and single drum 68 control both ailerons A, there are two independent drums with their hand levers and locking mechanism for controlling the stabilizers, and the cords leading from each drum lead to both ends of the stabilizers because the latter are lerger than the ailerons, more often brought into use, of greater necessity when they are used, and therefore demand stronger control. By turning one of the drums 98 in the proper direction, the hinge line 82 will be depressed as seen in Fig. 8, whereby the wing 80 turns around its pivotal point 81 and the wing 83 moves downward at its inner edge and the outer edge slides between the rollers 84 and frame-bar 85; by turning the drum 98 in the opposite direction, the other stretch of cord 86 draws upward on the hinge line and the stabilizer may be folded against the uppermost plane P so as to lie practically coincident therewith. These devices are useful when the air craft is unbalanced and tends to tip to one side and stay so, as it is most frequently induced to do by reason of cross currents or by its being overloaded on one side or the other, but these devices are also useful for purposely tilting the air craft on its keel as when the aviator intends to sail in a circle. Moreover the stablizers may be employed in descending, because when their hinge lines 82 are down to a considerable extent they afford a certain element of resistance to the air passing between the planes P, P. However, in their ordinary use the independent control of the stabilizers at opposite ends of the main framework will obviously be necessary.

The specific connection employed between the sticks or members of the frame is best seen in Figs. 16 to 19 inclusive. In these views a horizontal stick or member 110 carries a metal plate 111 bolted to it as at 112 and having an upstanding integral socket 113 for receiving the lower end of an upright member 114, which latter is slotted longitudinally above its lower end as at 115. Two other bolts 116 pass downward through the plate 111 on the member 110 with their bodies standing alongside the member 114 and having bends 117 to receive the piano wire braces as indicated in dotted lines at 118, and the upper ends of these bolts are connected by a cross bolt 119 which passes through the slot 115 in the member 114. With this construction the tightening up of the wires 118 by means of the turn buckles ordinarily employed within their length throws the strain onto the bolts 116 and by the latter it is communicated through the plate 111 to the lower side of the horizontal member 110. The upright member 114 meanwhile acts as a spacer, its lower end resting in the socket 113 on the plate 111 and its upper end resting within a similar socket beneath the overhead horizontal member (not shown) so that these two horizontal members are properly spaced no matter what the tension of the wires 118. If the parts should rattle just before any adjustment, the nut on the bolt 119 is loosened, so that afterward when it is tightened up all rattling is prevented.

The driving propeller D whereof an enlarged elevation is given in Fig. 20 comprises a hub 120 mounted on the main shaft 1 by any suitable means such as the nut 121 and the jam nut 122, and two blades or flukes 123 extending from diametrically opposite sides of this hub in a manner which is usual in propellers for flying machines. By preference I would make these blades of tough but light wood or of light metal such as aluminum, but their specific construction is such that, while their pitch or twist may differ at different points radially outward from the axis, there is no point where they stand in a plane at right angles to such axis and therefore every square inch of each blade or fluke will impart a thrust to the flying machine.

I do not wish to be limited to details or materials of parts further than as set forth by the claims below.

Thus it will be seen that I have produced an air craft which is herein illustrated and is preferably constructed with parallel planes although of course it might have but a single plane or there might be more than two; and although the operation and control of these machines is well understood I may briefly repeat it here. The aviator with his passenger or assistant boards the craft and the engine is started. The main clutch C is closed and the driving propeller D begins to rotate. The clutches 45 are closed, and the lifting propellers L begin to rotate. Soon their power lifts the machine off its supporting wheels and the force of the driving mechanism D starts it forward, and then the rudder R (and possibly the tail T) with or without the stabilizers S but preferably with the ailerons A, are thrown into action to assist the machine to rise. Having attained the proper altitude the stabilizers and ailerons are folded up near the upper plane P, and under normal conditions the machine may be easily guided horizontally and vertically by means of the rudder R and its tiller, or the latter may be locked and the machine guided by means of the tail T. If the aeronaut encounters cross winds or oblique currents, it may become desirable if not necessary to set the proper stabilizer S by means of the control mechanism best illustrated in Fig. 11; or the proper stabilizer is thrown into action in case he desires to turn about in a circle or curve and in which event that side of the machine which is on the outside of the curve would have to be raised. When he desires to ascend to a greater altitude, he will make use of both the rudder R and tail T, and possibly also of both stabilizers, although these should be ordinarily used to keep the machine on an even keel; and if he desires to ascend rapidly he may throw the lifting propellers into action in a manner which will be clear, although the power necessary to drive these propellers may ordinarily be saved and imparted to the driving propeller D. In order to descend or to soar, the same elements are used in the reverse manner excepting that it would not be desirable to employ the lifting propellers at that time. The rudder R and tail T may be used singly or conjointly, but in this case the ailerons A will doubtless be folded upward near the upper plane P. In case of accident so that the speed of descent increases until the machine is almost falling, the aviator has but to throw the lifting propellers into action and his fall is arrested. If the accident be such as to put his motor M out of commission, the aviator can save himself a fall by the combined use of the rudder, tail, both ailerons, and even both stabilizers if necessary, for when all are in action the machine will soar to the ground.

What is claimed as new is:

1. In an aeroplane, the combination with a framework dropped at its transverse center to afford space for the operator, a forward rudder, a rearward tail, controlling devices for these elements at the center of the machine and respectively in front and rear of said space, and a driving propeller mounted on a shaft standing along the center of the frame; of a motor and its main shaft disposed to one side of said space, connections between this shaft and that of the driving mechanism, hinged planes at the extremities of the frame, manual controls therefor located at the opposite side of said space from said motor, and connections between said planes and their respective controls.

2. The herein described air craft comprising fixed main planes extending transversely of the machine, lifting propellers at the extremities of said planes, two pairs of hinged planes next inside said propellers, manual means for adjusting them, a rudder at the front of the machine, a longitudinally curved tail at the rear end of the machine, means for turning this tail on its longitudinal axis, the driving mechanism, and a power plant.

3. The herein described air craft comprising fixed main planes extending transversely of the machine, lifting propellers at the extremities of said planes, hinged planes next inside said propellers, means for adjusting them, a rudder at the front of the machine, a longitudinally curved tail at the rear end of the machine, means for turning this tail manually on its longitudinal axis and setting it in adjusted position, the driving mechanism, and a power plant.

4. The herein described air craft comprising fixed main planes extending transversely of the machine, lifting propellers near the ends of said planes, hinged planes adjacent said propellers, means for adjusting them, a rudder at the front of the machine, a longitudinally curved tail at the rear end of the machine, means for turning this tail on its longitudinal center and setting it in adjusted position, the driving mechanism, and a power plant.

5. The herein described air craft comprising fixed main planes extending transversely of the machine, lifting propellers at the extremities of said planes, hinged planes inside said propellers, means for adjusting said hinged planes independently of each other, a longitudinally curved tail at the rear end of the machine, the driving mechanism, and a power plant.

6. In an aeroplane, the combination with the framework, a main plane extending transversely of said framework, and the propelling and steering mechanisms; of a movable plane at each end of said framework comprising two wings hingedly connected with each other at a point below said main plane, a pivotal connection between the rear edge of one wing and the framework near the rear edge of said main plane, a sliding connection between the other wing and the forward edge of said main plane, and means for adjusting the hinge line between said wings.

7. In an aeroplane the combination with the framework, a fixed plane extending transversely of said framework, and the propelling and steering mechanisms; of a movable plane at each end of said framework comprising two wings hingedly connected with each other at a point below said plane, a pivotal connection between the rear edge of one wing and the framework near the rear edge of said main plane, a sliding connection between the other wing and the forward edge of said main plane, pulleys carried beneath said fixed plane at each end of said hinged plane, and from each end of the hinge line between its wings a stretch of cord leading upward over one of said pulleys and downward and another stretch of cord leading from said hinge line downward, both said stretches being led through suitable guides to a controlling device within reach of the operator.

8. In a biplane, the combination with superimposed fixed main planes mounted on a framework extending transversely of the machine, and the propelling and steering mechanisms; of a movable plane hinged at its front edge to the front edge of the uppermost main plane near each end of the latter, means controllable by the operator for raising and lowering the rear edges of said hinged planes in opposition to each other, other movable planes next inside those mentioned and at opposite ends of said main frame, each consisting of two wings whereof the rearmost is hinged to the framework near the rear edge of the uppermost fixed plane, and the foremost is hinged to the front edge of the rearmost and slidably mounted in the front edge of said uppermost fixed plane, and means under the control of the operator for raising and lowering the meeting edges of each pair of wings independently of the adjustment of the meeting edges of the other pair of wings.

9. In a biplane, the combination with superimposed main planes mounted on a framework extending transversely of the machine, and the propelling and steering mechanisms; of a movable plane hinged at its front edge to the front edge of the uppermost main plane near each end of the latter, means controllable by the operator for raising and lowering the rear edges of said hinged planes, other hinged planes at opposite ends of the framework and beneath the uppermost main plane, each including a wing hinged at its rear edge to the framework near the rear edge of said main plane and adjustable vertically at its forward edge, and means for adjusting said wings.

10. In a biplane, the combination with parallel fixed main planes superimposed one above the other and slightly dished on their under sides; of two wings hingedly connected with each other and also slightly dished to correspond with the dish of the uppermost plane, said wings being located between the fixed planes and hingedly mounted along the outer edge of one wing, and means for adjusting the angle of said wings to each other or for raising the wings into substantial parallelism with the upper plane.

In testimony whereof I have hereunto set my hand in presence of two subscribing witnesses.

REUBEN B. SWANK.

Witnesses:
JOHN J. HOOVER,
F. MAUDE HOOVER.

Copies of this patent may be obtained for five cents each, by addressing the "Commissioner of Patents Washington, D. C."